US008818908B2

(12) United States Patent
Altice et al.

(10) Patent No.: US 8,818,908 B2
(45) Date of Patent: Aug. 26, 2014

(54) PROVIDING RECYCLING FEES

(75) Inventors: Brad M. Altice, Wake Forest, NC (US); Anandakrishnan Narayanan, Morrisville, NC (US); Joanne O'Lear, Raleigh, NC (US); William J. Reilly, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1307 days.

(21) Appl. No.: 11/680,272

(22) Filed: Feb. 28, 2007

(65) Prior Publication Data

US 2008/0208771 A1 Aug. 28, 2008

(51) Int. Cl.
G06Q 50/22 (2012.01)
(52) U.S. Cl.
USPC .......................................... 705/308
(58) Field of Classification Search
CPC .................. G06Q 10/30; G06Q 20/20; B29B 2017/0089; B65F 1/0033
See application file for complete search history.

(56) References Cited

U.S. PATENT DOCUMENTS

| 6,993,502 B1* | 1/2006 | Gryglewicz et al. | 705/31 |
| 2002/0023004 A1* | 2/2002 | Hollander et al. | 705/22 |
| 2002/0052792 A1* | 5/2002 | Johnson et al. | 705/19 |
| 2002/0138365 A1* | 9/2002 | Matsubara | 705/26 |
| 2003/0069745 A1* | 4/2003 | Zenko | 705/1 |
| 2003/0191675 A1* | 10/2003 | Murashita | 705/7 |
| 2004/0039587 A1* | 2/2004 | Horoshige et al. | 705/1 |
| 2005/0072842 A1* | 4/2005 | Yamagiwa | 235/375 |
| 2006/0069588 A1* | 3/2006 | Ritter | 705/1 |
| 2006/0184383 A1* | 8/2006 | Davis et al. | 705/1 |
| 2007/0198289 A1* | 8/2007 | Hiroshige et al. | 705/1 |

OTHER PUBLICATIONS http://eerc.ra.utk.edu/clean/nepsi/ http://eerc.ra.utk.edu/clean/nepsi/ National Electronics Product Stewardship Initiative (NEPSI) Homepage, Press Release Feb. 13, 2004.*
http://eerc.ra.utk.edu/clean/nepsi/pdfs/hybrid.pdf Nepsi Final Document (NEPSI Hybid), Jun. 13, 2003.*
http://eerc.ra.utk.edu/clean/nepsi/pdfs/collect.pdf Base Service Collection Incentive Payment Discussion Feb. 10-Nov. 2004.*
http://74.125.47.132/search?q=cache:hSTfcC5IhTMJ:www.texasenvironment.org/downloadit.cfm%3FDocID%3D168+recycling+and+local+taxes&cd=7&hl=en&ct=clnk&gl=us Texas Campaign for Environment.*
http://www.in.gov/nrc_dnr/lakemichigan/polpre/polprec.html.*
http://eerc.ra.utk.edu/insites/ins5-2.htm.*

(Continued)

Primary Examiner — Ryan Zeender
Assistant Examiner — Dana Amsdell
(74) Attorney, Agent, or Firm — Yee & Associates, P.C.; John Pivnichny

(57) ABSTRACT

A system for providing a fee associated with a location for an ordered object. In response to receiving an order for an object from a customer that includes a location for where to ship the object, it is determined whether the location requires a fee for the object. The fee for the object for the location is requested from a fee service in response to determining that the location does require the fee for the object. The fee for the object for the location is received from the fee service. The fee for the object for the location is added to a customer price and a first customer response. Then, the first customer response that includes the fee for the object for the location is sent to the customer.

15 Claims, 7 Drawing Sheets

(56) References Cited

OTHER PUBLICATIONS http://www.opala.org/solid_waste/Cassie_Wyss_Opedl.html.*
http://commons.wikimedia.org/wiki/File:Bottle_deposit.jpg.*
http://web.archive.org/web/20051215170605/http://www.boe.ca.gov/sptaxprog/ewfaqsdetails.htm#4.*
http://web.archive.org/web/20060617183356/batterycouncil.org/states.html.*

* cited by examiner

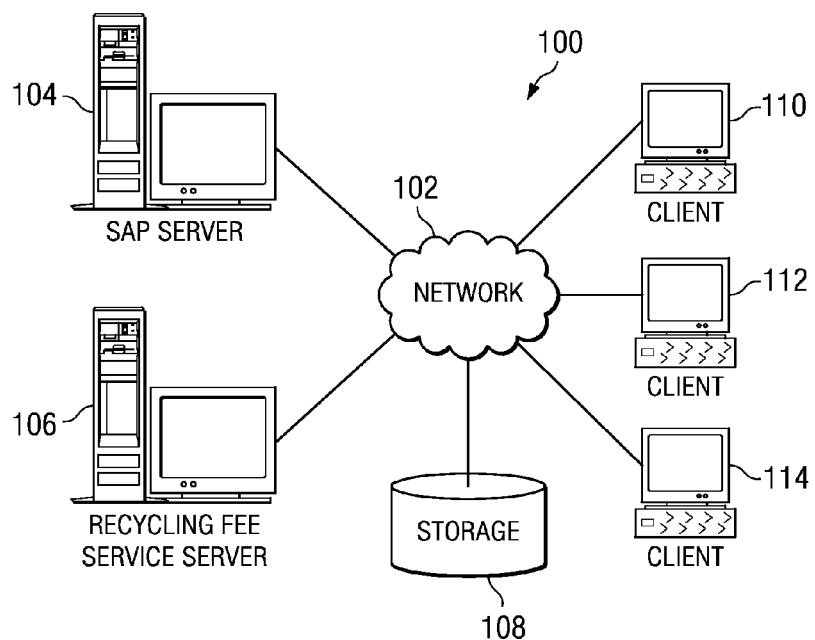
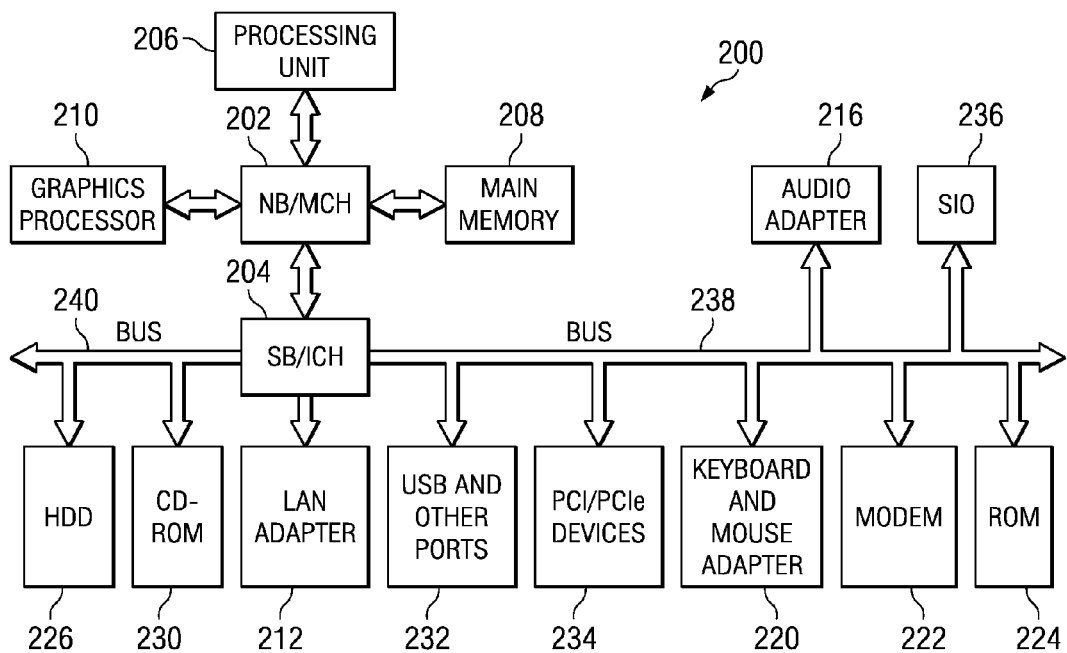

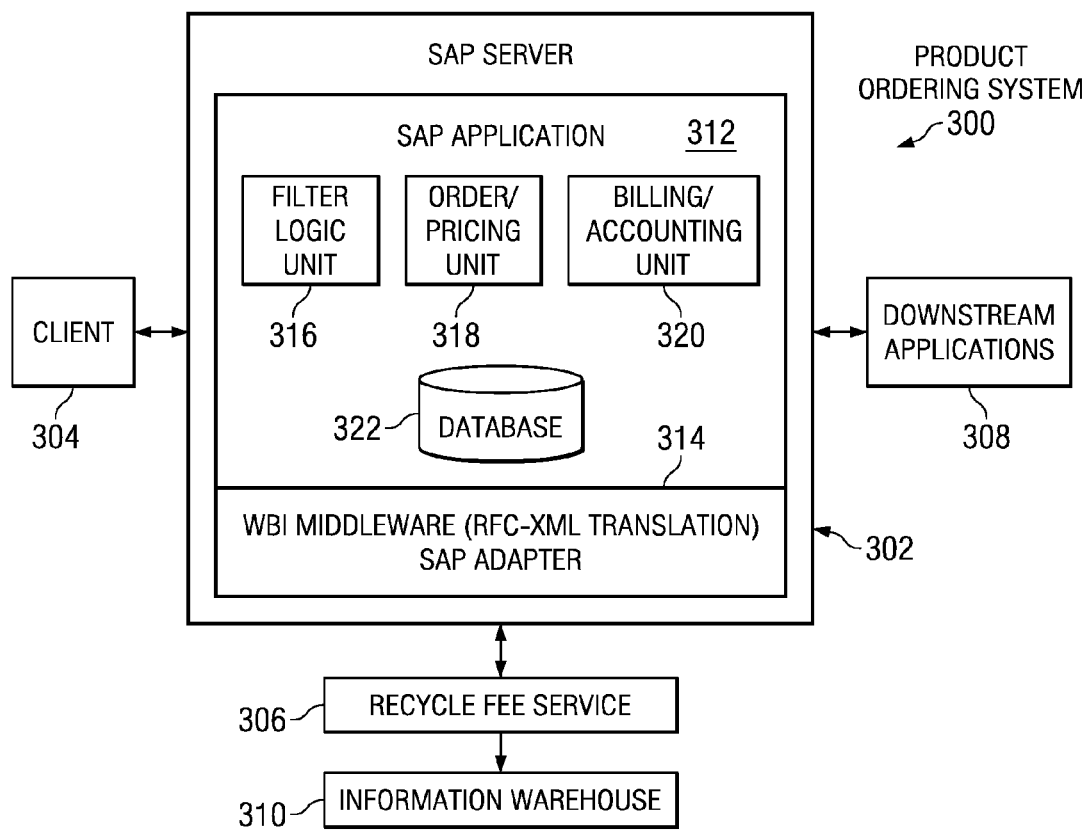
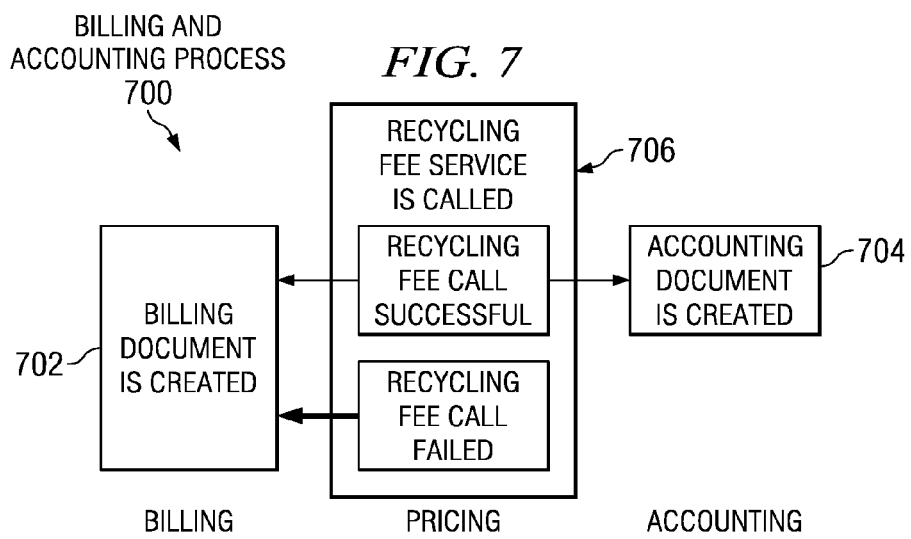

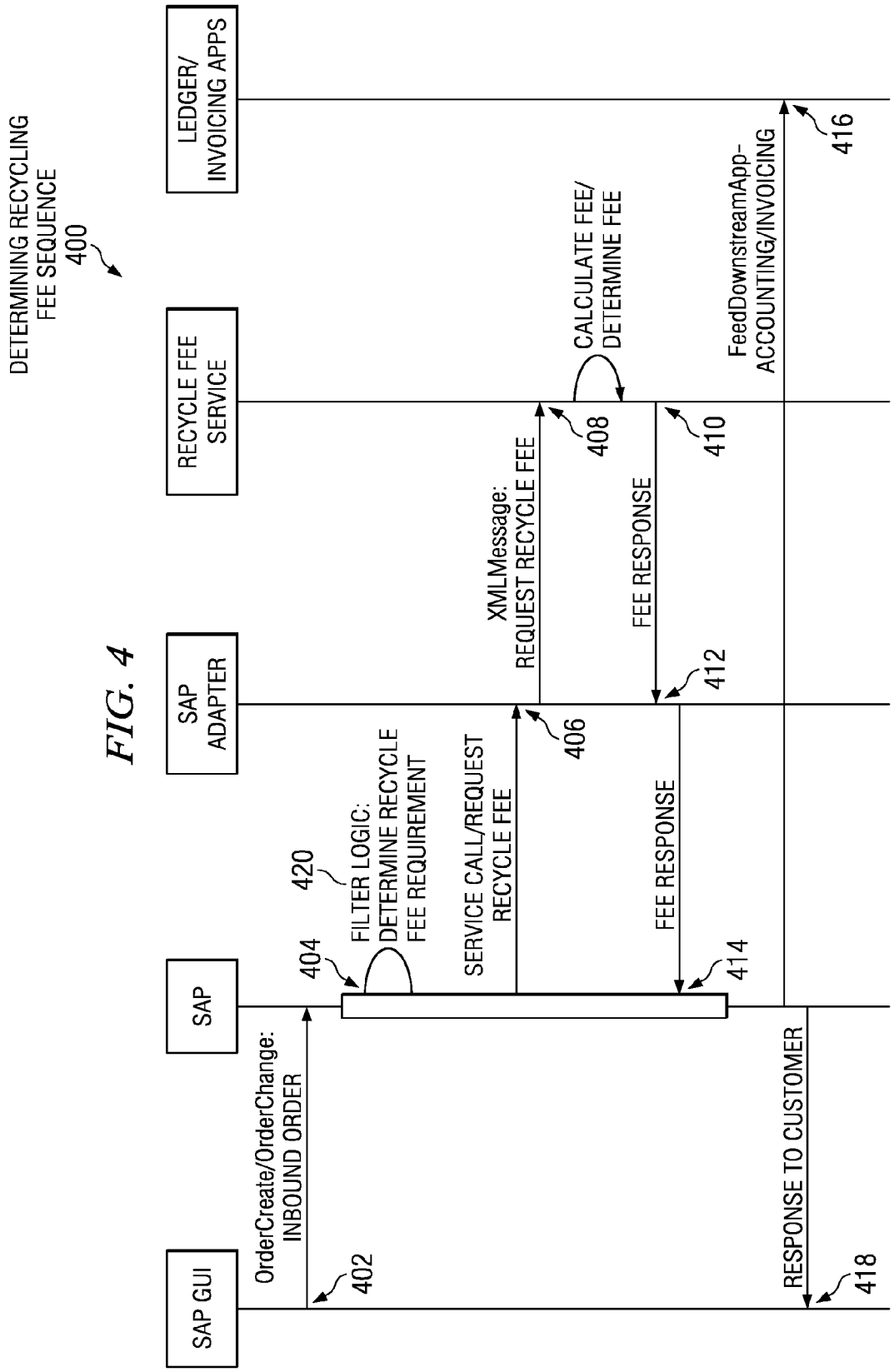

FIG. 5A

DATA 500

EXAMPLE OF DATA PASSED TO SERVICE FOR CONFIGURABLE MATERIAL (TYPE MODEL FEATURE-TMF)

| COUNTRY | REGION | LINE ITEM | MATERIAL TYPE | MATERIAL | MODEL NUMBER | FEATURE | RECYCLE RATE | RATE TYPE | CURRENCY |
|---|---|---|---|---|---|---|---|---|---|
| US | CA | 000010 | TM | 3170NEW | 061 | (NO CHARACTERISTIC TO BE PASSED) | | | |
| US | CA | 000010 | TF | 3170NEW | 061 | MK_3170_1235 | | | |
| US | CA | 000010 | TF | 3170NEW | 061 | MK_3170_1236 | | | |
| US | CA | 000010 | TF | 3170NEW | 061 | MK_3170_1234 | | | |

DATA 516

EXAMPLE OF DATA PASSED FROM SERVICE FOR TMF

| COUNTRY | REGION | LINE ITEM | MATERIAL TYPE | MATERIAL | MODEL NUMBER | FEATURE | RECYCLE RATE | RATE TYPE | CURRENCY |
|---|---|---|---|---|---|---|---|---|---|
| US | CA | 000010 | TM | 3170NEW | 061 | (NO CHARACTERISTIC TO BE PASSED) | | | |
| US | CA | 000010 | TF | 3170NEW | 061 | MK_3170_1235 | R01 | 6 | USD |
| US | CA | 000010 | TF | 3170NEW | 061 | MK_3170_1236 | | | |
| US | CA | 000010 | TF | 3170NEW | 061 | MK_3170_1234 | R02 | 8 | USD |

EXAMPLE OF DATA PASSED TO SERVICE FOR PREDEFINED PRODUCT (SEO)

| COUNTRY | REGION | LINE ITEM | MATERIAL TYPE | MATERIAL | MODEL NUMBER | FEATURE | RECYCLE RATE | RATE TYPE | CURRENCY |
|---|---|---|---|---|---|---|---|---|---|
| US | CA | 000010 | S | XMACHUS | | (NO CHARACTERISTIC TO BE PASSED) | | | |
| US | CA | 000010 | SM | XMACHUS | 21C | | | | |
| US | CA | 000010 | SF | XMACHUS | 21C | MK_7016_1234 | | | |
| US | CA | 000010 | SF | XMACHUS | 21C | MK_7016_1235 | | | |
| 502 | 504 | 506 | 508 | 510 | 512 | 514 | | | |

DATA 524

FIG. 5D

EXAMPLE OF DATA PASSED FROM SERVICE FOR SEO MATERIAL

| COUNTRY | REGION | LINE ITEM | MATERIAL TYPE | MATERIAL | MODEL NUMBER | FEATURE | RECYCLE RATE | RATE TYPE | CURRENCY |
|---|---|---|---|---|---|---|---|---|---|
| US | CA | 000010 | S | XMACHUS | | (NO CHARACTERISTIC TO BE PASSED) | | | |
| US | CA | 000010 | SM | XMACHUS | 21C | | | | |
| US | CA | 000010 | SF | XMACHUS | 21C | MK_7016_1234 | R01 | 6 | USD |
| US | CA | 000010 | SF | XMACHUS | 21C | MK_7016_1235 | R03 | 10 | USD |
| 502 | 504 | 506 | 508 | 510 | 512 | 514 | 518 | 520 | 522 |

DATA 526

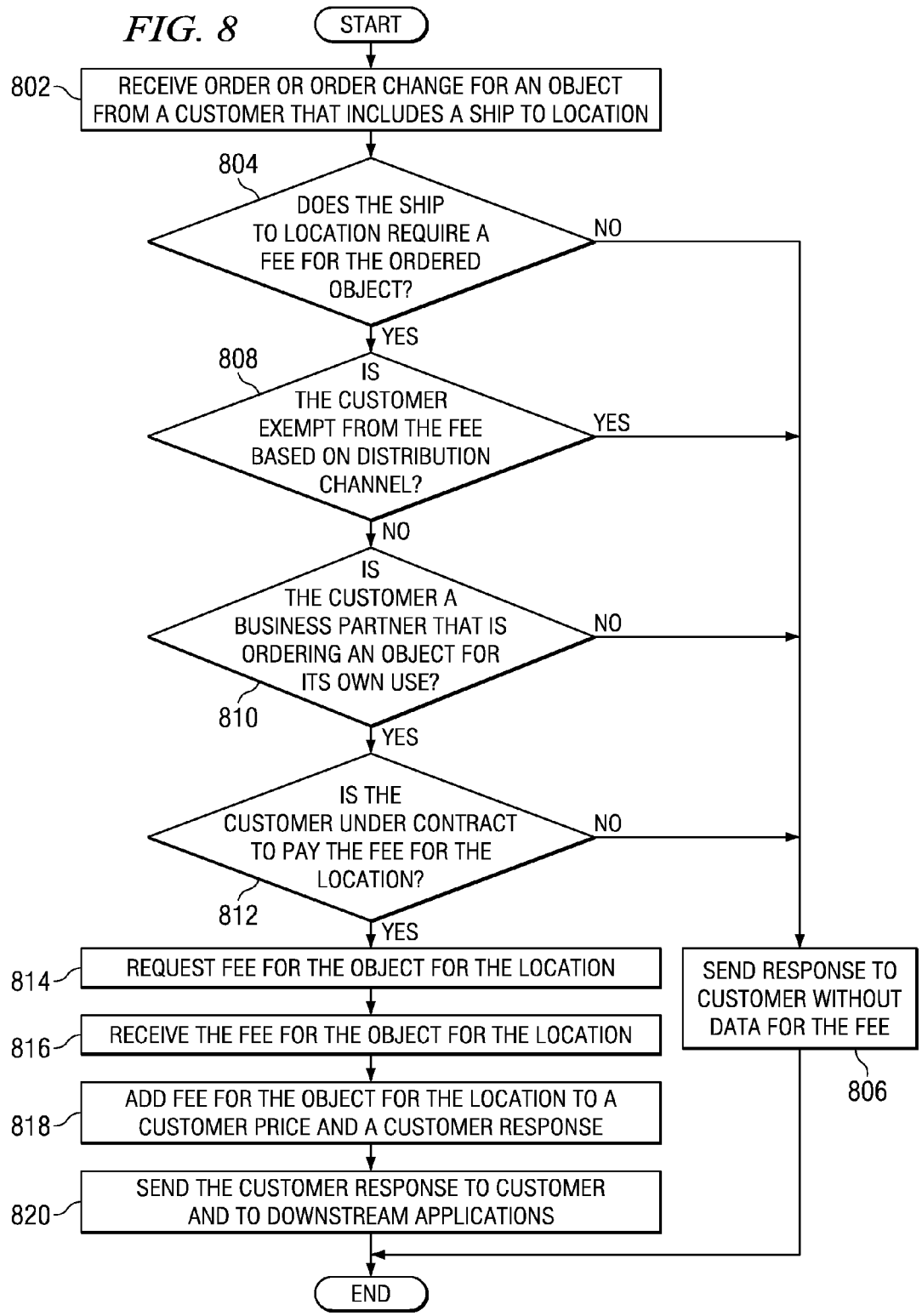

PROVIDING RECYCLING FEES

BACKGROUND OF THE INVENTION

1. Field of the Invention

The present invention relates generally to an improved data processing system. More specifically, the present invention is directed to a computer implemented method, system, and computer usable program code for providing recycling fees to a product ordering system.

2. Description of the Related Art

Today, in the United States, and throughout the world, many legal entities are requiring businesses to pay a variety of environmental recycling fees for a variety of different products. However, each city, county, state, territory, or country may require a different environmental recycling fee for the same product or each city, county, state, territory, or country may require environmental recycling fees for a set of different products. For example, the state of California in the United States requires graduated recycling fees based on the size of a computer monitor. The territory of Alberta in Canada also requires recycling fees for computer monitors, but exempts certain localities and customers that agree to separately collect fees. But, the country of Portugal requires specific recycling fees for batteries.

Currently, the methods used by businesses to handle these different recycling fee requirements for each legal entity, such as, for example, California, Alberta, and Portugal, are disjointed. Each business may handle each of these recycling fee requirements in a completely different way, with each business requiring different data and key information. In addition, business implementation times to support new recycling fee legal requirements are long and the implementation process expensive. Lastly, each business independently handles these recycling fee requirements on its own, such as, for example, by performing a manual search of each legal entity's respective environmental recycling fees.

Therefore, it would be beneficial to have an improved computer implemented method, system, and computer usable program code for providing recycling fees for different legal entities for different products in a single, flexible model that supports faster, less expensive implementations that may be utilized by a plurality of businesses as a callable, reusable asset.

SUMMARY OF THE INVENTION

Illustrative embodiments provide a computer implemented method, system, and computer usable program code for providing a fee that is associated with a ship to location for an ordered object. The fee for the ordered object is an environmental recycling fee. The environmental recycling fee is determined based on an environmental recycling rule or law obtained from a legal entity. The legal entity is associated with a specific geographic area. The specific geographic area includes the ship to location for the ordered object. The ordered object is one of a customer configurable product or a predefined product. The predefined product is a single entity offering.

In response to receiving an order for an object from a customer that includes a location for where to ship the object, a product ordering system determines whether the ship to location for the object may require a fee. In response to determining that the location may require the fee for the object, the product ordering system requests the fee for the object for the location from a fee service. The product ordering system utilizes a filter logic unit to determine whether to request the fee for the object for the location. The filter logic unit utilizes one or more tables to make the determination as to whether to request the fee for the object for the location from the fee service. The one or more tables are stored in a storage device. The fee service is a recycling fee service that determines the required recycling fee for the ordered object. The recycling fee service obtains the environmental recycling rule or law from the legal entity via the network, which the service uses to determine the required environmental recycling fee for the ordered object.

After the product ordering system receives the fee for the object for the location from the fee service via the network, the product ordering system adds the fee for the object for the location to a customer price and a customer response. The customer response may be the order, an invoice, or a billing. Then, the product ordering system sends the customer response to the customer. In addition, the product ordering system sends the customer response, which is the order, invoice, or billing, to one or more downstream applications. The one or more downstream applications are accounting applications.

However, if the product ordering system determines that the location does not require the fee for the object, the product ordering system does not request a recycling fee calculation, does not include the fee in the customer price, and sends a customer response that does not include data for the fee to the customer. Furthermore, if the product ordering system determines that the customer is exempt from the fee for the object for the location based on a distribution channel, is a business partner that is not ordering the object for its own use, or is not under contract to pay the fee for the object for the location, the product ordering system does not request a recycling fee calculation, does not include the fee in the customer price, and sends the customer response that does not include the fee to the customer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which illustrative embodiments may be implemented;

FIG. 2 is a block diagram of a data processing system is shown in which illustrative embodiments may be implemented;

FIG. 3 is an exemplary illustration of a product ordering system in accordance with an illustrative embodiment;

FIG. 4 is an exemplary illustration of a sequence diagram for determining fees for ordered objects in accordance with an illustrative embodiment;

FIG. 5A is an exemplary illustration of data passed to a fee service for a configurable object in accordance with an illustrative embodiment;

FIG. 5B is an exemplary illustration of data passed from a fee service for a configurable object in accordance with an illustrative embodiment;

FIG. 5C is an exemplary illustration of data passed to a fee service for a predefined object in accordance with an illustrative embodiment;

FIG. 5D is an exemplary illustration of data passed from a fee service for a predefined object in accordance with an illustrative embodiment;

FIG. 7 is an exemplary illustration of document processing for billing and accounting with a fee service call in accordance with an illustrative embodiment; and FIG. 8 is a flowchart illustrating an exemplary process for providing a fee associated with an ordered object in accordance with an illustrative embodiment.

DETAILED DESCRIPTION OF THE PREFERRED EMBODIMENT

Figure 6:
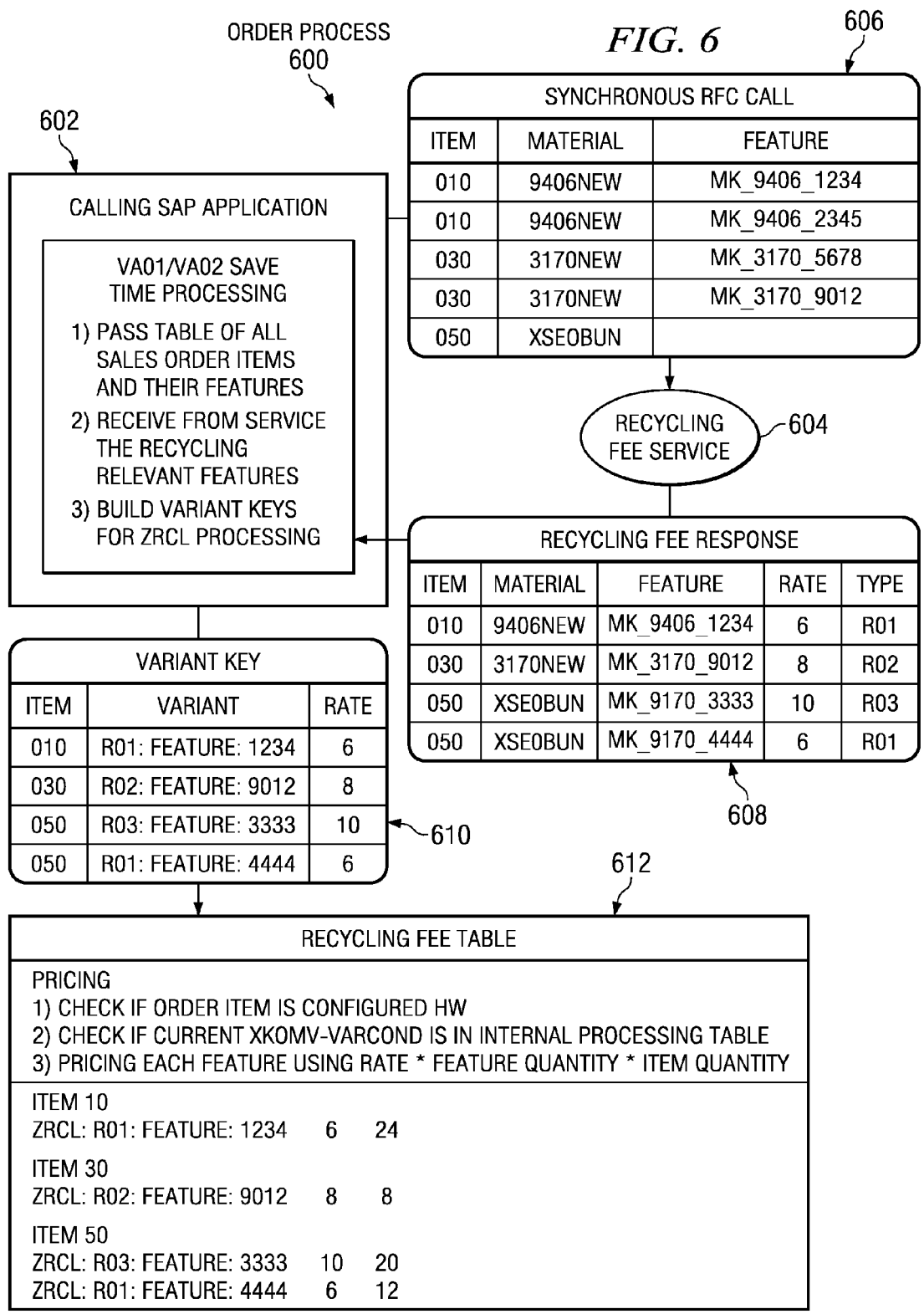
FIG. 6 is an exemplary illustration of real-time processing of an order or order change from a calling application to a fee service in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 may, for example, represent a product ordering system whereby customers order products online. Network data processing system 100 contains network 102, which is the medium used to provide communications links between various computers and other devices connected together within network data processing system 100. Network 102 may include connections, such as wire, wireless communication links, or fiber optic cables.

In the depicted example, server 104 and server 106 connect to network 102, along with storage unit 108. Server 104 may, for example, be a Systems Applications and Products (SAP) server, which may be utilized by a business or enterprise to provide the capability to manage financial, asset, and cost accounting, production operations and materials, personnel, plants, and archived documents. Server 106 may, for example, be a recycling fee service server that provides a plurality of recycling fees, which are required by a plurality of legal entities or governmental agencies, for a plurality of different objects. Server 106 provides these recycling fees to a calling application, such as an SAP application that resides on server 104, upon request.

Storage 108 may, for example, be a repository for recycling fee data. The recycling fee data may, for example, include a list of the plurality of recycling fees, a list of the plurality of legal entities or governmental agencies requiring the recycling fees, and a list of the plurality of objects associated with the respective recycling fees. In addition, the recycling fee data also may include information, such as exceptions and exemptions to the required recycling fees by the legal entities for the objects. Storage 108 may, for example, store this recycling fee data in one or more tables. However, it should be noted that storage 108 may store the recycling fee data in either a structured or an unstructured format.

Clients 110, 112, and 114 also connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. In addition, clients 110, 112, and 114 may order objects or products from server 104. Also, it should be noted that network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to NB/MCH 202. Processing unit 206 may contain one or more processors and may even be implemented using one or more heterogeneous processor systems. Graphics processor 210 may be coupled to NB/MCH 202 through an accelerated graphics port (AGP), for example.

In the depicted example, local area network (LAN) adapter 212 is coupled to SB/ICH 204 and audio adapter 216, keyboard and mouse adapter 220, modem 222, read only memory (ROM) 224, universal serial bus (USB) and other ports 232, and PCI/PCIe devices 234 are coupled to SB/ICH 204 through bus 238, and hard disk drive (HDD) 226 and CD-ROM 230 are coupled to SB/ICH 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). HDD 226 and CD-ROM 230 may, for example, use an integrated drive electronics (IDE) or serial advanced technology attachment (SATA) interface. A super I/O (SIO) device 236 may be coupled to SB/ICH 204.

An operating system runs on processing unit 206 and coordinates and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as HDD 226, and may be loaded into main memory 208 for execution by processing unit 206. The processes of the illustrative embodiments may be performed by processing unit 206 using computer implemented instructions, which may be located in a memory such as, for example, main memory 208, ROM 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in NB/MCH 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments provide a computer implemented method, system, and computer usable program code for providing a fee that is associated with a ship to location for an ordered object. The fee is a fixed charge that a customer, which ordered the object, is obligated to pay. The fee for the ordered object may, for example, be an environmental recycling fee. The environmental recycling fee is determined based on an environmental recycling rule or law obtained from a legal entity or governmental agency. A legal entity is an entity, such as, for example, a city, state, territory, province, or country, which creates and enforces laws, such as environmental recycling fee laws. The legal entity is associated with a specific geographic area. The specific geographic area includes the ship to location for the ordered object. The ordered object may, for example, be a single item, such as a battery. Or, the ordered object may include a plurality of components and/or features, such as a customer configurable product or a predefined product. A customer configurable product is a product, such as a computer, that a customer configures according to the customer's requirements during the ordering process. A predefined product may, for example, be a single entity offering. A single entity offering is a predefined bundle of components and/or features that comprise an ordered product.

In response to receiving an order for an object from a customer that includes a location for where to ship the object, a product ordering system determines whether a legal entity requires a fee for the ordered object for the ship to location. In response to determining that the location does require the fee for the object, the product ordering system requests the fee for the object for the location from a fee service. The fee service is a recycling fee service. The recycling fee service is connected to a network and obtains the environmental recycling rule or law, which is used to determine the required environmental recycling fee for the ordered object, from the legal entity via the network.

The product ordering system utilizes a filter logic unit to determine whether to request the fee for the object for the location. The filter logic unit utilizes one or more tables to make the determination as to whether to request the fee for the object for the location from the fee service. The one or more tables are stored in a storage device. After the product ordering system receives the fee for the object for the location from the fee service via the network, the product ordering system adds the fee for the object for the location to a customer price and a customer response. The customer response may, for example, be an order, an invoice, or a billing.

Then, the product order system sends the customer response to the customer. In addition, the product ordering system sends the customer response, which is the order, invoice, or billing, to one or more downstream applications. The one or more downstream applications may, for example, be financial, accounting, and/or ledger applications.

However, if the product ordering system determines that the location does not require the fee for the object, the product ordering system does not request a recycling fee calculation, does not include the fee in a customer price, and sends the customer response that does not include data for the fee to the customer. Furthermore, if the product ordering system determines that the customer is exempt from the fee for the object for the location based on a distribution channel, is a business partner that is not ordering the object for its own use, or is not under contract to pay the fee for the object for the location, the product ordering system does not request a recycling fee calculation, does not include the fee in a customer price, and sends the customer response that does not include data for the fee to the customer. A distribution channel is the way that products or services reach the customer. Typical examples of distribution channels are wholesale, retail, and/or direct sales.

Thus, illustrative embodiments create a single, flexible system to support differing legal recycling fee requirements by a plurality of different legal entities for a plurality of objects. Illustrative embodiments may be setup as a callable service that supports a plurality of different business areas and service a plurality of different companies. Illustrative embodiments base the recycling fees on a ship to location or address for the ordered products. Illustrative embodiments provide a recycling fee service as a single point to determine and return the appropriate recycling fee for the ordered product based on product characteristics and on applicable business rules.

Illustrative embodiments may implement the recycling fee service as a standard Web service that, for example, leverages an enterprise hub system. Applications, such as SAP applications, may indirectly call the recycling fee service via, for example, a synchronous SAP remote function call (RFC) interface. Alternatively, other applications may directly call the recycling fee service. Applications may include in the call for the recycling fee service information on the ordered products, such as ship to locations, channels, payers, and contracts, which may or may not require a recycling fee.

Applications may call the recycling fee service anytime an order for a product that has a ship to destination for a legal entity that is specified in a filter table. This filtering criteria, which tells the calling application when to call the recycling fee service, may be maintained in a table which may be controlled in a master system, such as a system associated with the callable recycling fee service, itself. Also, this filtering criteria may be passed to the calling applications as part of a predetermined distribution process.

The recycling fee service accepts a list of ordered products or objects, the legal entity associated with the ship to location for the ordered products, and a quantity for each ordered product. The recycling fee service returns a reference for each recycling fee relevant object within the customer order and the amount of the environmental recycling fee for each recycling fee relevant object, respectively.

As a result, illustrative embodiments provide a single point for maintaining new and updated recycling fee legal requirements. Consequently, illustrative embodiments provide faster, less expensive implementations for new and updated legal requirements for recycling fees. Also, illustrative embodiments provide an easier and more efficient maintenance process for updating these legal requirements. Changes to transactions, such as sales orders, may, for example, automatically receive recycling fee updates, which include changes to the legal recycling fee structure since the time of the original order.

Further, illustrative embodiments provide a more consistent method for different business areas and for a plurality of different companies to support the different legal requirements. In addition, illustrative embodiments provide the ability to handle different product structures across business entities. Furthermore, the recycle fee provided by illustrative embodiments satisfies all legal requirements for the ordered object and illustrative embodiments provide the flexibility of adding the recycling fee before or after taxes within pricing procedures. Moreover, illustrative embodiments provide a real-time order response for required recycling fees on ordered objects to enable transaction oriented requirements, such as, for example, on-line customer orders.

With reference now to FIG. 3, an exemplary illustration of a product ordering system is depicted in accordance with an illustrative embodiment. Product ordering system 300 may, for example, be network data processing system 100 in FIG. 1. Product ordering system 300 includes SAP server 302, client 304, recycling fee service 306, downstream applications 308, and information warehouse 310.

SAP server 302 may, for example, be SAP server 104 in FIG. 1. SAP server 302 includes SAP application 312 and SAP adapter 314. SAP application 312 contains a plurality of software modules to provide a plurality of business functions for SAP server 302. SAP adapter 314 provides network communication capabilities for SAP server 302. SAP adapter 314 may, for example, be a middleware, such as Web intermediaries (WBI).

SAP application 312 includes filter logic unit 316, order/pricing unit 318, and billing/accounting unit 320. SAP application 312 uses filter logic unit 316 to determine if a product order requires an inquiry into possible recycling fees. Filter logic unit 316 performs this recycling fee inquiry determination by utilizing one or more tables that contain recycling fee data. The recycling fee data may include recycling fees, legal entities requiring the recycling fees, objects associated with the recycling fees, recycling fee exemptions, and recycling fee exceptions. Filter logic unit 316 accesses these one or more tables containing the recycling fee data from database 322. Database 322 is a non-volatile data storage device.

Recycling fee service 306 may, for example, be server 106 in FIG. 1. Recycling fee service 306 provides recycling fees required by legal entities, such as states or countries, for particular objects. Recycling fee service 306 obtains environmental recycling rules and laws, which are used to determine the required environmental recycling fees for ordered objects, from the legal entities via a network, such as network 102 in FIG. 1. Recycling fee service 306 may store these environmental recycling rules and laws and required recycling fees in information warehouse 310. Information warehouse 310 may represent a plurality of applications, such as E-announce, ECCM, and RDH, which provide product information, along with applicable recycling fees.

Calling SAP application 312 only calls recycling fee service 306 for geographical areas, channels, payers, and contracts that require a recycling fee for ordered products. In other words, calling SAP application 312 calls recycling fee service 306 anytime an order for the destination country/state is specified in a filter table. This filter table, which tells calling SAP application 312 when to call recycling fee service 306, is maintained in a database, such as, for example, storage 108 in FIG. 1. In addition, this filter table may be passed to calling SAP application 312 as part of an established distribution. This established distribution may, for example, occur every two (2) hours. SAP application 312 may store these one or more filter tables in database 322, for example.

During order creation, calling SAP application 312 calls recycling fee service 306 once per line item. During an order change, calling SAP application 312 calls recycling fee service 306 if re-pricing is performed for a line item, the configuration of the ordered product is changed, or if the ship to location is overridden. Prior to bill or invoice creation, calling SAP application 312 calls recycling fee service 306 once per line item to verify the recycle fee. In other words, to make sure that the recycle fee is the current rate.

Calling SAP application 312 passes or sends all configuration data for configurable products, such as machine type models (MTMs), and predefined products, such as single entity offerings (SEOs), returned from a configuration call to recycling fee service 306. Calling SAP application 312 receives relevant recycling fees for each machine, model, and/or feature that requires a recycling fee from recycling fee service 306. The recycling fee includes a recycle rate and a rate type. The recycle rate may, for example, be Rate R01, R02, and R03. The recycle rate is associated with the rate type. The rate type is a value or amount, such as, for example, 6, 8, or 10, related to a respective recycle rate. For example, R01 may be equal to 6, R02 may be equal to 8, and R03 may be equal to 10. The recycle rate is used to calculate totals per machine, model, and/or feature. In other words, the recycle rate is a fixed amount.

Filter table definitions are transported into calling SAP application 312. Then, calling SAP application 312 accepts the filter table data from recycling fee service 306. Four tables are created for calling SAP application 306. Table 1, which is inclusive, includes countries and regions, such as states, that require recycling fees for ordered objects. Table 2, which is exclusive, includes distribution channels that are exempt from the recycling fees for ordered products required by the countries and regions found in Table 1.

Table 3, which is an exception, i.e., if a customer is excluded from paying the recycling fee in Table 2 due to distribution channel, then check to see if the customer is in table 3. If customer is in table 3, then send request to recycling fee service 306. Table 3 includes business partners that are ordering products for their own use. In addition, if Table 3 includes customers by distribution channels that are exempt from the recycling fee, then do not send request to recycling fee service 306. Table 4, which also is an exception, i.e., if a customer is excluded from paying the recycling fee in Table 2 due to distribution channel, then check to see if the customer is in table 4. If the customer is in table 4, then send request to recycling fee service 306. Table 4 includes customers that are under contract to pay the required recycling fees for ordered products.

Calling SAP application 312 applies the relevant recycling fees to orders, which are identified by recycling fee service 306, for type-models, features, and SEOs that are not exempt from the recycling fees. For example, recycling fees do not apply to business partners, unless the business partners are ordering products for their own use. Calling SAP application 312 calls recycle fee service 306 once per order line item. Calling SAP application 312 calls recycle fee service 306 prior to billing create for the current rate for the recycling fee. Recycling fee data received from recycling fee service 306 is stored in a table.

Calling SAP application 312 checks recycle fee service 306 provided filter tables to see if a recycling fee determination should be made. If a recycling fee determination should be made based on data within the 4 filter tables, calling SAP application 312 extracts configuration information for ordered configurable and predefined products. Calling SAP application 312 then builds a table from the extracted configuration information for the ordered configurable and predefined products, which is passed to recycling fee service 306. Recycling fee service 306 receives the table of extracted configuration information for the ordered products.

Afterward, recycling fee service 306 loops through the configuration information table of features that require recycling fees and builds variant keys that will be used. The pricing variant keys are dynamically built based on the table information that instructs the logic how to build the variant key. These variant keys will be stored in a pricing table for subsequent pricing logic to use.

SAP application 312 uses order/pricing unit 318 to calculate the price of the ordered product. The final product price is based on the recycling fee rate and quantity of the components and/or features requiring the recycling fee. Further, order/pricing unit 318 may include the relevant recycling fees before or after taxes are calculated for the ordered product depending on business practice and applicable tax laws. Of course, if filter logic unit 316 determines that recycling fees are not required based on the filtering table data, then order/pricing unit 318 calculates the final product price without recycling fees.

SAP application 312 uses billing/accounting unit 320 to prepare invoices or billings for ordered products. Billing/accounting unit 320 includes in the invoice or billing any relevant recycling fees for an ordered product. Furthermore, billing/accounting unit 320 may send the customer response data to downstream applications 308. Downstream applications 308 may, for example, represent financial or ledgering applications. However, it should be noted that billing/accounting unit 320 does not include the relevant recycling fees for leased products to downstream applications 308.

Client 304 may, for example, be client 110 in FIG. 1. Client 304 is a data processing system, such as a computer, PDA, or wireless telephone, which a user utilizes to send a product order. The user uses client 304 to communicate an electronic order to SAP application 312 via a network. After sending the electronic product order, client 304 receives a customer response from SAP application 312. The customer response received by client 304 may include a recycling fee for any component or feature of the ordered product requiring such a fee.

With reference now to FIG. 4, an exemplary illustration of a sequence diagram for determining fees for ordered objects is depicted in accordance with an illustrative embodiment. Determining recycling fee sequence 400 may be implemented in a data processing system, such as, for example, product ordering system 300 in FIG. 3. Determining recycling fee sequence 400 is a sequence of stages to determine if a recycling fee is required for an ordered product. Determining recycling fee sequence 400 includes stages 402, 404, 406, 408, 410, 412, 414, 416, and 418.

At stage 402, a user of a client device, such as, for example, client 304 in FIG. 3, uses a GUI in the client device to interact with an SAP application, such as, for example, SAP application 312 in FIG. 3, to submit a customer order for one or more products. The one or more products may, for example, be configurable products and/or predefined products. At stage 404, the SAP application receives the customer order and uses filter logic 420, such as, for example, filter logic unit 316 in FIG. 3, to determine if a recycling fee inquiry is necessary for the customer order based on data contained in one or more filtering tables. If filter logic 420 determines that a recycling fee inquiry is not necessary, then the process proceeds to stage 418 where the SAP application returns a customer response, such as an order, invoice, or billing, for the ordered product to the client device.

If filter logic 420 determines that a recycling fee inquiry is necessary, then the SAP application uses an SAP adapter, such as SAP adapter 314 in FIG. 3, to send a recycling fee request to a recycling fee service, such as, for example, recycling fee service 306 in FIG. 3, at stage 406. The SAP adapter may, for example, translate the recycling fee request into an extensible markup language (XML). At stage 408, the recycling fee service receives the recycling fee request and determines the appropriate recycling fees for the respective components and/or features of the one or more ordered products.

At stage 410, the recycling fee service returns a recycling fee response to the SAP adapter. In turn, the SAP adapter sends the recycling fee response to the SAP application at stage 414. After receiving the recycling fee response from the recycling fee service, the SAP application sends a customer response containing the relevant recycling fees for the one or more ordered products to one or more downstream applications, such as, for example, financial or ledgering applications, for accounting purposes at stage 416. In addition, the SAP application sends a customer response to the customer containing the recycling fees to the client device at stage 418.

With reference now to FIG. 5A, an exemplary illustration of data passed to a fee service for a configurable object is depicted in accordance with an illustrative embodiment. Data 500 represents a set of data that an SAP application, such as, for example, SAP application 312 in FIG. 3, sends to a recycling fee service, such as, for example, recycling fee service 306 in FIG. 3, in order for the recycling fee service to determine the appropriate recycling fees for the respective components and/or features of the configurable ordered product. Data 500 includes country 502, region 504, line item 506, material type 508, material 510, model number 512, and feature 514. Of course, data 500 may include any information necessary for processes of illustrative embodiments to be accomplished.

Country 502 is the country the ordered product is to be shipped to after order completion. In this particular example of FIG. 5A, country 502 is the United States (US). Region 504 is the region the ordered product is to be shipped to within country 502. In this particular example of FIG. 5A, region 504 is the state of California (CA). Feature 514 lists the features of the ordered product, such as MK__3170__1235, MK__3170__1236, and MK__3170__1234.

With reference now to FIG. 5B, an exemplary illustration of data passed from a fee service for a configurable object is depicted in accordance with an illustrative embodiment. Data 516 represents a set of data that a recycling fee service, such as, for example, recycling fee service 306 in FIG. 3, sends to an SAP application, such as, for example, SAP application 312 in FIG. 3, in order for the SAP application to calculate the appropriate price, which includes any recycling fees, for the configurable ordered product. Data 516 includes recycle rate 518, rate type 520, and currency 522 in addition to the data set included in data 500 in FIG. 5A. Of course, data 516 may include any information necessary for processes of illustrative embodiments to be accomplished.

Recycle rate 518 is the rate at which the recycling fee is calculated for the component or feature of the configurable ordered product. The recycle rate may, for example, be R01, R02, R03, and so on. Rate type 520 is the amount associated with recycle rate 518. Currency 522 is the currency associated with rate type 520. In this particular example of FIG. 5B, recycle rate 518 for feature MK__3170__1235 is R01, which is equal to 6 US dollars (USD). Also, in this particular example of FIG. 5B, recycle rate 518 for feature MK__3170__1234 is R02, which is equal to 8 USD.

With reference now to FIG. 5C, an exemplary illustration of data passed to a fee service for a predefined object is depicted in accordance with an illustrative embodiment. Data 524 represents a set of data that an SAP application, such as, for example, SAP application 312 in FIG. 3, sends to a recycling fee service, such as, for example, recycling fee service 306 in FIG. 3, in order for the recycling fee service to determine the appropriate recycling fees for the respective components and/or features of the predefined ordered product, such as a single entity offering. Data 524 includes a similar set of data as data 500 in FIG. 5A.

With reference now to FIG. 5D, an exemplary illustration of data passed from a fee service for a predefined object is depicted in accordance with an illustrative embodiment. Data 526 represents a set of data that a recycling fee service, such as, for example, recycling fee service 306 in FIG. 3, sends to an SAP application, such as, for example, SAP application 312 in FIG. 3, in order for the SAP application to calculate the appropriate price, which includes any recycling fees, for the predefined ordered product. Data 526 includes a similar set of data as data 516 in FIG. 5B. In this particular example of FIG. 5D, recycle rate 518 for material type SM is R01, which is equal to 6 USD. Also, in this particular example of FIG. 5D, recycle rate 518 for feature MK__7016__1235 is R03, which is equal to 10 USD.

With reference now to FIG. 6, an exemplary illustration of real-time processing of an order or order change from a calling application to a fee service is depicted in accordance with an illustrative embodiment. Order process 600 is the real-time processing of an order or order change from calling SAP application 602, such as, for example, SAP application 312 in FIG. 3, to recycling fee service 604, such as, for example, recycling fee service 306 in FIG. 3. Calling SAP application 602 utilizes an SAP adapter, such as, for example, SAP adapter 314 in FIG. 3, to send synchronous remote function call 606 to recycling fee service 604. Synchronous remote function call 606 includes a set of configuration data associated with the customer order for a product, such as data 500 in FIG. 5.

Recycling fee service 604 receives synchronous remote function call 606 and processes the set of data. After processing synchronous remote function call 606, recycling fee service 604 returns recycling fee response 608 to calling SAP application 602. Recycling fee response 608 includes a set of data, such as, for example, data 516 in FIG. 5B, regarding relevant recycling fees for an ordered product. Subsequent to receiving recycling fee response 608, calling SAP application 602 creates variant key 610 from the data contained in recycling fee response 608. Variant key 610 is a key that lists the components and/or features that require a recycling fee within the ordered product, along with their respective recycling rates and rate types, such as recycling rate 518 and rate type 520 in FIG. 5B. Recycling fee service 604 dynamically creates variant key 610 and stores variant key 610 in a database, such as database 322 in FIG. 3.

Calling SAP application 602 utilizes variant key 610 to produce recycling fee table 612. Recycling fee table 612 includes all data necessary for an order/pricing unit, such as, for example, order pricing unit 318 in FIG. 3, to calculate the price of the order product, which includes any required recycling fees. Calling SAP application 602 also stores recycling fee table 612 in the database.

With reference now to FIG. 7, an exemplary illustration of document processing for billing and accounting with a fee service call is depicted in accordance with an illustrative embodiment. Billing and accounting process 700 is a process for creating billing document 702 and accounting document 704 after a recycling fee service, such as, for example, recycling fee service 306 in FIG. 3, receives recycling fee call 706 from a calling SAP application, such as, for example, SAP application 312 in FIG. 3. If recycling fee call 706 is successful, then the calling SAP application employs a billing/accounting unit, such as, for example, billing/accounting unit 320 in FIG. 3, to create billing document 702 and accounting document 704.

Afterward, the calling SAP application sends billing document 702 to the customer that ordered the product, such as, for example, client 304 in FIG. 3. In addition, the calling SAP application sends accounting document 704 to one or more downstream financial application, such as, for example, downstream applications 308 in FIG. 3. If recycling fee call 706 failed, then the calling SAP application uses the billing/accounting unit to only create billing document 702 and not accounting document 704. In other words, the failure of recycling fee call 706 will not prevent billing document 702 from being created, but only prevents accounting document 704 from being created. Failure of a recycling fee call means that, for what ever reason, a response to a recycling fee request was not able to be sent.

In addition, even though the recycling fee call 706 may fail, the customer order will still be scheduled for production. In other words, the process of recycling fee pricing and the process of order scheduling are mutually exclusive activities. Furthermore, it should be noted that certain document types, such as credit, debit, and rebate memos, which require a reference to a billing document, do not require a call for the recycle fee service.

An accounting team may, for example, determine the cause of the failure of recycling fee call 706 and attempt to release billing document 702 to accounting. Also, at this time the accounting team may reinstitute pricing of recycling fees and resend recycling fee call 706 to the recycling fee service. If at this time recycling fee call 706 is successful, then the calling SAP application creates accounting document 704.

With reference now to FIG. 8, a flowchart illustrating an exemplary process for providing a fee associated with an ordered object is shown in accordance with an illustrative embodiment. The process shown in FIG. 8 may be implemented in an SAP application, such as, SAP application 312 in FIG. 3.

The process begins when the SAP application receives an order, or a change in an order, from a customer, such as client 304 in FIG. 3, for an object via a network, such as, for example, network 102 in FIG. 1 (step 802). The ordered object is, for example, a customer configurable product and/ or a preconfigured product. In addition, the customer order or order change includes a location of where to ship the ordered object.

Subsequent to receiving the order, or order change, from the customer for the object in step 802, the SAP application utilizes a filtering logic unit, such as, for example, filtering logic unit 316 in FIG. 3, to make a determination as to whether the ship to location requires a fee for the ordered object (step 804). The fee is an environmental recycling fee, which is required by a legal entity or governmental agency. If the ship to location for the ordered object does not require a fee, no output of step 804, then the SAP application sends a customer response to the customer that does not include data for the fee (step 806) and the process terminates thereafter. The customer response may, for example, be the order, an invoice, or a billing for the ordered object.

If the ship to location for the ordered object does require a fee, yes output of step 804, then the filtering logic unit makes a determination as to whether the customer is exempt from the fee based on a distribution channel (step 808). If the customer is exempt from the fee based on a distribution channel, yes output of step 808, then the process returns to step 806. If the customer is not exempt from the fee based on a distribution channel, no output of step 808, then the filtering logic unit makes a determination as to whether the customer is a business partner that is ordering the object for its own use (step 810).

If the customer is a business partner that is not ordering the object for its own use, no output of step 810, then the process returns to step 806. If the customer is a business partner that is ordering the object for its own use, yes output of step 810, then the filtering logic unit makes a determination as to whether the customer is under contract to pay the fee (step 812). If the customer is not under contract to pay the fee, no output of step 812, then the process returns to step 806. If the customer is under contract to pay the fee, yes output of step 812, then the SAP application requests the fee for the ordered object for the location from a fee service, such as recycling fee service 306 in FIG. 3, via the network (step 814).

After requesting the fee for the ordered object for the location from the fee service in step 814, the SAP application receives the fee for the ordered object for the location from the fee service (step 816). Subsequent to receiving the fee for the ordered object for the location from the fee service in step 816, the SAP application adds the fee for the ordered object for the location to a customer price and a customer response (step 818). Then, the SAP application sends the customer response to the customer (step 820). In addition, the SAP application sends the customer response, which is the order, invoice, or billing, to one or more downstream applications. The one or more downstream applications may, for example, be accounting applications. The process terminates thereafter.

Thus, illustrative embodiments provide a computer implemented method, system, and computer usable program code for providing recycling fees associated with a location for an ordered product. The invention may take the form of an entirely hardware embodiment, an entirely software embodiment, or an embodiment containing both hardware and software elements. In a preferred embodiment, the invention is implemented in software, which includes but is not limited to firmware, resident software, microcode, et cetera.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a ROM, a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, et cetera) may be coupled to the system either directly or through intervening I/O controllers.

Network adapters also may be coupled to the system to enable the data processing system to become coupled to other data processing systems, remote printers, or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a server utilized by a business for providing an environmental recycling fee for an ordered object, the computer implemented method comprising:
   responsive to receiving from a customer using a client device an order for a customer configurable product that includes a plurality of components according to requirements of the customer, determining, by the server utilized by the business, whether to send a request for an environmental recycling fee response for the customer configurable product to a recycling fee service server via a network;
   responsive to determining that the environmental recycling fee for the customer configurable product should be requested from the recycling fee service server, extracting, by the server utilized by the business, configuration data that lists the plurality of components in the customer configurable product according to the requirements of the customer;
   sending, by the server utilized by the business, the configuration data that lists the plurality of components in the customer configurable product and the request for the environmental recycling fee response for each recycling fee relevant component within the plurality of components listed in the configuration data for the customer configurable product to the recycling fee service server via the network;

receiving, by the server utilized by the business, the environmental recycling fee response for each recycling fee relevant component within the plurality of components listed in the configuration data for the customer configurable product from the recycling fee service server via the network;

adding, by the server utilized by the business, the environmental recycling fee response for each recycling fee relevant component within the plurality of components listed in the configuration data for the customer configurable product to a customer price and a first customer response; and sending, by the server utilized by the business, the first customer response to the customer via the network.

2. The computer implemented method of claim 1, further comprising:

responsive to determining that the environmental recycling fee for the customer configurable product should not be requested from the recycling fee service server, not requesting, by the server utilized by the business, the environmental recycling fee response and sending a second customer response that does not include the environmental recycling fee response to the customer.

3. The computer implemented method of claim 2, further comprising:

determining, by the server utilized by the business, if the customer is exempt from the environmental recycling fee for the customer configurable product for a location based on a distribution channel;

responsive to determining that the customer is not exempt from the environmental recycling fee for the customer configurable product for the location based on the distribution channel, sending, by the server utilized by the business, the first customer response that includes the environmental recycling fee response for the customer configurable product for the location to the customer; and responsive to determining that the customer is exempt from the environmental recycling fee for the customer configurable product for the location based on the distribution channel, not requesting, by the server utilized by the business, the environmental recycling fee response and sending the second customer response that does not include the environmental recycling fee response to the customer.

4. The computer implemented method of claim 3, further comprising:

determining, by the server utilized by the business, if the customer is a business partner that is ordering the customer configurable product for its own use;

responsive to determining that the customer is the business partner that is ordering the customer configurable product for its own use, sending, by the server utilized by the business, the first customer response that includes the environmental recycling fee response for the customer configurable product for the location to the customer; and responsive to determining that the customer is the business partner that is not ordering the customer configurable product for its own use, not requesting, by the server utilized by the business, the environmental recycling fee response and sending the second customer response that does not include the environmental recycling fee response to the customer.

5. The computer implemented method of claim 4, further comprising:

determining, by the server utilized by the business, if the customer is under contract to pay the environmental recycling fee for the customer configurable product for the location;

responsive to determining that the customer is under contract to pay the environmental recycling fee for the customer configurable product for the location, sending, by the server utilized by the business, the first customer response that includes the environmental recycling fee response for the customer configurable product for the location to the customer; and responsive to determining that the customer is not under contract to pay the environmental recycling fee for the customer configurable product for the location, not requesting, by the server utilized by the business, the environmental recycling fee response and sending the second customer response that does not include the environmental recycling fee response to the customer.

6. The computer implemented method of claim 1, further comprising:

sending, by the server utilized by the business, the first customer response that includes the environmental recycling fee response for the customer configurable product to one or more downstream applications.

7. The computer implemented method of claim 6, wherein the one or more downstream applications are accounting applications.

8. The computer implemented method of claim 5, wherein the step for determining if the customer is exempt from the environmental recycling fee for the customer configurable product for the location based on the distribution channel, the step for determining if the customer is the business partner that is ordering the customer configurable product for its own use, and the step for determining if the customer is under contract to pay the environmental recycling fee for the customer configurable product for the location are performed by the server utilized by the business using a filter logic unit, and wherein the filter logic unit utilizes the one or more tables to execute each of the determining steps, and wherein the one or more tables utilized to execute each of the determining steps are stored in a storage device.

9. The computer implemented method of claim 1, wherein the environmental recycling fee is determined based on at least one of an environmental recycling rule or an environmental recycling law obtained from a legal entity.

10. The computer implemented method of claim 9, wherein the legal entity is associated with a specific geographic area.

11. The computer implemented method of claim 10, wherein the specific geographic area includes a location for where to ship the customer configurable product.

12. The computer implemented method of claim 9, wherein the recycling fee service server obtains the environmental recycling rule or the environmental recycling law associated with the environmental recycling fee from the legal entity via the network, and wherein the recycling fee service server provides the environmental recycling fee response upon receiving a request for the environmental recycling fee response for the customer configurable product for a location from a product ordering system, and wherein the product ordering system requests the environmental recycling fee response for the customer configurable product for the location based on a determination by a filter logic unit.

13. The computer implemented method of claim 2, wherein a customer response is at least one of the order, an invoice, or a billing for the customer configurable product.

14. A computer program product stored in a computer usable storage medium having computer usable program code embodied therein for providing an environmental recycling fee for an ordered object, the computer program product comprising:

computer usable program code configured to determine, by a server utilized by a business, whether to send a request for an environmental recycling fee response for a customer configurable product that includes a plurality of components according to requirements of a customer to a recycling fee service server via a network in response to receiving from the customer using a client device an order for the customer configurable product;

computer usable program code configured to extract, by the server utilized by the business, configuration data that lists the plurality of components in the customer configurable product according to the requirements of the customer in response to determining that the environmental recycling fee for the customer configurable product should be requested from the recycling fee service server;

computer usable program code configured to send, by the server utilized by the business, the configuration data that lists the plurality of components in the customer configurable product and the request for the environmental recycling fee response for each recycling fee relevant component within the plurality of components listed in the configuration data for the customer configurable product to the recycling fee service server via the network;

computer usable program code configured to receive, by the server utilized by the business, the environmental recycling fee response for each recycling fee relevant component within the plurality of components listed in the configuration data for the customer configurable product from the recycling fee service server via the network;

computer usable program code configured to add, by the server utilized by the business, the environmental recycling fee response for each recycling fee relevant component within the plurality of components listed in the configuration data for the customer configurable product to a customer price and a first customer response; and computer usable program code configured to send, by the server utilized by the business, the first customer response to the customer via the network.

15. The computer program product of claim 14, further comprising:

computer usable program code configured to send, by the server utilized by the business, a second customer response that does not include the environmental recycling fee response to the customer in response to determining that the environmental recycling fee response for the customer configurable product should not be requested from the recycling fee service server.

* * * * *